United States Patent Office 3,507,023
Patented Apr. 21, 1970

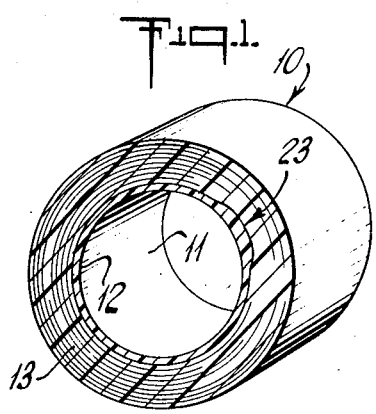
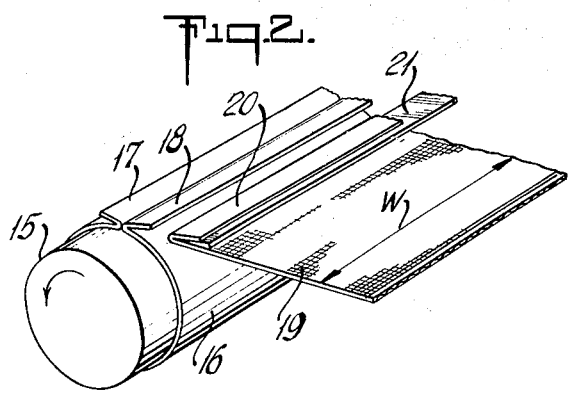
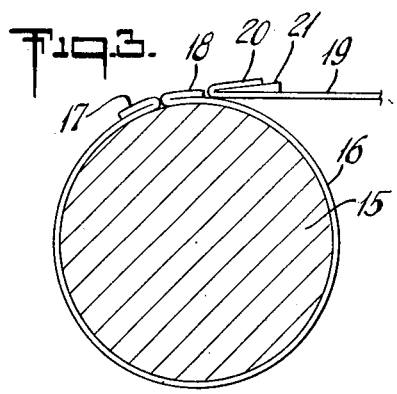
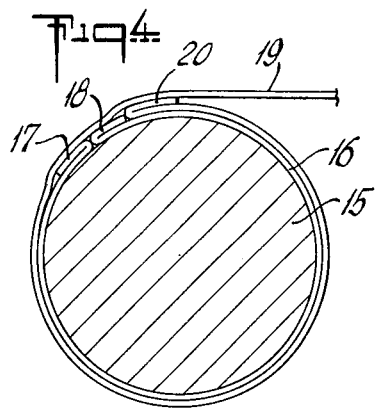
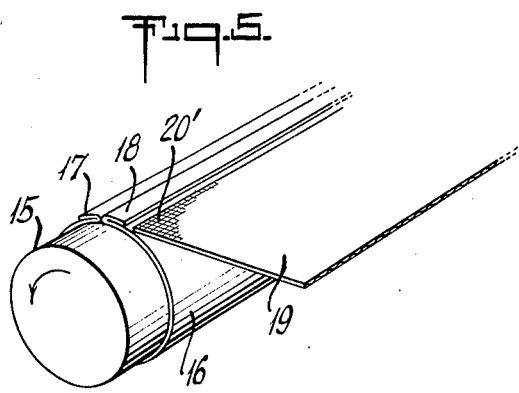
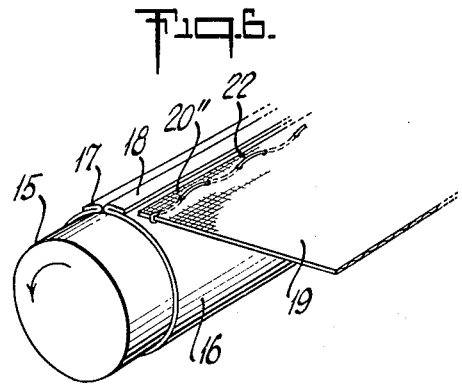

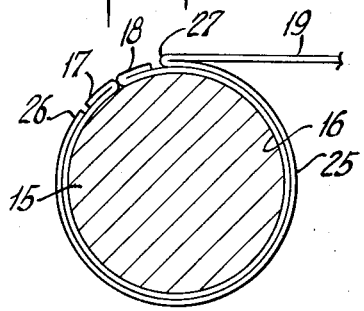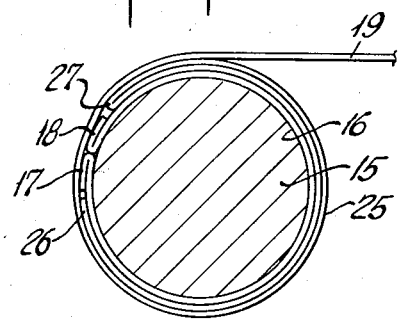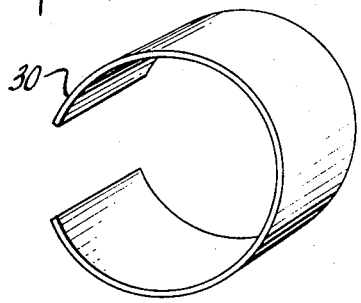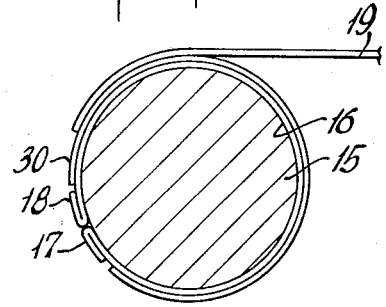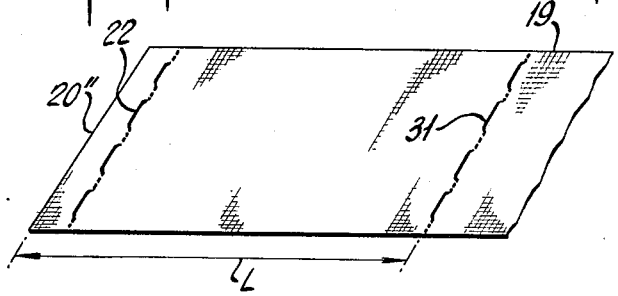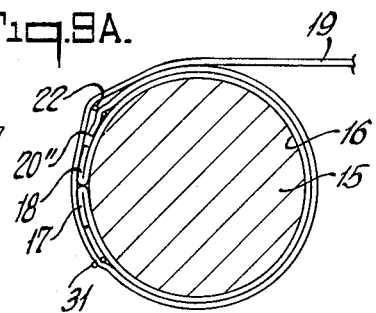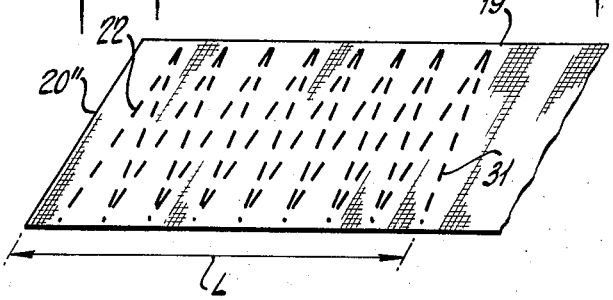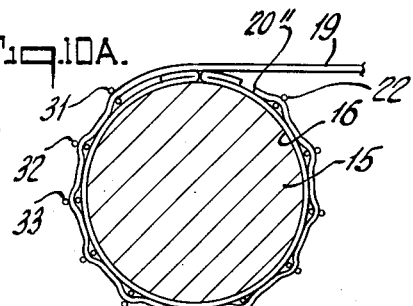

3,507,023
PLASTIC-IMPREGNATED FABRIC JOURNAL BEARING
Richard J. Matt, West Simsbury, Conn., and Harold Ward Conru, South Burlington, Vt., assignors, by mesne assignments, to Textron Inc., Providence, R.I., a corporation of Delaware
Filed May 2, 1968, Ser. No. 726,099
Int. Cl. B21h 1/12
U.S. Cl. 29—149.5
20 Claims

ABSTRACT OF THE DISCLOSURE

The invention contemplates an improved method of making fabric-lined journal bearings, of bore size determined by a mandrel. A piece of low-friction fabric material is cut from rectilinear stock, to such length between cut-off ends as to substantially equal the peripheral extent of the mandrel. The cut-off ends are sewn, to form an elongated sock, surrounding the mandrel, and leaving an angularly localized thickened portion at the seam. A piece of bondable fabric, impregnated with hardenable material, is then wrapped onto the mandrel, beginning at a point angularly offset from the locally thickened seam. The assembly is thereafter cured to hardness, and the mandrel removed.

---

This invention relates to a method of making a journal bearing in which low-friction fabric material is relied upon to achieve low-friction at the bore of the bearing.

In the field of plastic bearings wherein reliance is placed on low-friction properties in certain synthetic fibers to achieve low friction in bearing operation, it is known to rely on composite or double-woven fabric in which two different materials are woven together, namely, a low-friction material such as fibrous polytetrafluoroethylene (Teflon), and a bondable material such as cotton, linen, fibreglass, or the like. The fabric is impregnated with phenolic, epoxy or other hardenable material and is then cured to hardness in the desired shape. The fabric is woven so as to expose the low-friction fibers at the bearing face, when molded or otherwise shaped.

In using such materials for journal bearings, a strip of the fabric is impregnated with the hardenable material and then wrapped on a mandrel to desired built-up thickness, as a spiral development about the mandrel. Although this technique is effective in terms of technical proficiency of the ultimate product, it is unnecessarily wasteful of the low-friction fiber. Proposals have been made to save the low-friction fiber by specially weaving a cloth so as to incorporate the low-friction material near one edge, to a width adequate for peripheral coverage of a given sized mandrel; but this technique requires costly weaving set-ups, wherein different-width edges must be woven for each journal-bearing bore size to be accommodated.

It is, accordingly, an object of the invention to provide an improved method of making a journal bearing of the character indicated, wherein the utmost economy of low-friction material can be realized, without sacrifice to operational proficiency.

Another object is to achieve the foregoing object with a method inherently flexibly lending itself to use of the same woven fabrics for manufacture of journal bearings of a wide variety of bore and of outside diameter sizes.

Other objects and various further features of novelty and invention will be pointed out or will occur to those skilled in the art from a reading of the following specification in conjunction with the accompanying drawings. In said drawings, which show, for illustrative purposes only, preferred embodiments of the invention:

FIG. 1 is a simplified view in perspective showing a journal bearing of the invention, the exposed end face being shown cut and in section to better illustrate relationships;

FIG. 2 is a fragmentary perspective view to illustrate steps of a first embodiment of the method of the invention;

FIGS. 3 and 4 are enlarged views in side elevation to illustrate successive steps in performing the method of FIG. 2;

FIGS. 5 and 6 are views similar to FIG. 2 to illustrate alternatives;

FIGS. 7 and 7A are simplified views similar to FIGS. 3 and 4, to illustrate steps in a modified method;

FIGS. 8 and 8A are simplified views to illustrate steps in another modified method;

FIGS. 9 and 9A are simplified views to illustrate steps in a further modified method; and FIGS. 10 and 10A are simplified views to illustrate steps in a still further modified method.

Briefly stated, the invention contemplates an improved method of making fabric-lined journal bearings, of bore size determined by a mandrel. A piece of low-friction fabric material is cut from rectilinear stock, to such length between cut-off ends as to substantially equal the peripheral extent of the mandrel. The cut-off ends are sewn, to form an elongated sock, surrounding the mandrel, and leaving an angularly localized thickened portion at the seam. A piece of bondable fabric, impregnated with hardenable material, is then wrapped onto the mandrel, beginning at a point angularly offset from the locally thickened seam. The assembly is thereafter cured to hardness, and the mandrel removed; alternatively, the assembly may be partially cured with the mandrel in place, and then final-cured after removing the mandrel.

FIG. 1 illustrates the kind of bearing produced by the methods of the invention. The bearing is a sleeve 10 having a bore 11 with inherent self-lubricating or low-friction properties determined by such properties in a fibrous element of an inner layer 12 of fabric. Outside of this layer 12 is a convolute development region 13 containing as many wrapped-up turns as desired of a different fabric which, for purposes of the invention, will merely be termed a fabric of bondable material, as for example, cotton-duck, linen, fiberglass, and the like. The solidity of the bearing is determined by an impregnation with hardenable material such as phenolic, epoxy or the like, and the sectioning for plastic for both regions 12–13 will be understood to apply for the employment of essentially a single body of hardening plastic permeating all layers of weave and cured to ultimate hardness.

In FIG. 2, we illustrate that the bearing 10 may be made in reference to a cylindrical mandrel 15 having a periphery precisely finished to determine the ultimate bore in the desired bearing. The low-friction material used in the inner layer 12 is in FIG. 2 a single rectangular piece 16 of suitable low-friction fabric. This piece 16 is intended for circumferential envelopment of the mandrel 15 and in accordance with the invention should be a small amount longer than substantially this circumferential extent, so that its ends may be secured, as by stitching an elongated seam, thus forming an elongated sock. The seam produces flaps 17–18 which are preferably external to the sock body and laid back against the same, to define a substantially uniform and continuous bore at which low-friction material abuts the mandrel 15. The piece 16 may thus be cut from a bolt or other rectilinear piece of the fabric so as to define a length between cut-off edges 17 and 18 which is slightly in excess of substantially the periphery of the mandrel 15.

The fabric 16 may be one of a variety of known materials, such as for example, a weave of all-Teflon, etched or otherwise treated, as desired for greater bondability. On the other hand, it may be a composite of Teflon and bondable or filler materal wherein the filler materials are twisted with the Teflon to make the threads from which the fabric is woven, or wherein the fabric is doublewoven to expose substantially only the Teflon threads at the inner face (i.e., at the bore 11) and the bondable threads at the outer face (i.e., adjacent the outer wrap-up layers 13).

The bondable material 19 in FIG. 2 may be as previously indicated and of width W corresponding with the width of the piece 16. In FIG. 2, the corresponding edges of the low-friction material 16 and the bondable material 19 are not secured together, as in our copending application, Ser. No. 703,702, filed Feb. 7, 1968, but are positioned in angularly offset relation (e.g., in angular adjacency, as shown) and do not overlap.

To fabricate the illustrated bearing by the step in FIG. 2, the pieces 16–19, are preferably first soaked in or impregnated with liquid plastic material (which need only be called hardenable); in certain cases, it may suffice to impregnate only one of the pieces 16–19 and to rely on plastic flow from the impregnated to the unimpregnated piece to achieve an interlocked relationship upon curing. The sock is assembled upon the mandrel 15 with the seam flaps 17–18 externally exposed and laid back against the sock body, as shown in FIGS. 2 and 3, thus forming an angularly localized thickened portion of the sock. In FIGS. 2 and 3, the starting end or edge 20 of the bondable piece 19 is folded back on itself to establish an angularly localized thickened portion of the bondable piece 19. An elongated wedge-shaped tool 21 is shown in the crease of the folded end 20. This tool enables accurate location of the end 20 adjacent to or otherwise angularly offset from the seam flap 18 and also permits squeezing or clamp action against the sock during the initial wrap-up phase. The mandrel 15 and tool 21 are then caused to rotate in the direction shown by the arrow, while tension is maintained on piece 19. This causes the bondable piece 19 to squeeze against the remaining exposed surface of the sock before overlapping the flaps 17–18. Thereafter, the tool 21 may be longitudinally withdrawn (FIG. 4) and the bondable material is wrapped in successive layers around the low-friction lining. This process is continued until the desired radial thickness of build-up is achieved, and preferably the lay-up is under tension so as to achieve a tight compaction of the fabric layers.

Upon completion of the desired radial build-up, the wrapped mandrel may be placed in a cylindrical mold (not shown) and the hardenable material subjected to a curing process, to the point of fully hardening the assembly. The wrapped mandrel may also be cured, without a mold, in an oven; such curing may be performed either with or without having first encased the wrapped mandrel in a vacuum bag. Use of the vacuum-bag technique achieves added pressure during the cure, and it also helps remove solvents such as would be required with polyimides. Heat-shrinkable plastic such as Mylar or nylon may also be employed to compress the wrapped mandrel during cure and post cure. After curing, the mandrel is released, release being facilitated by employment of a suitable parting agent as a coating prior to sock assembly to the mandrel.

In certain cases, it may be desired to impregnate the pieces 16 and 19 independently, and prior to stitching. Thus, the impregnant and the degree of impregnation may be optimized for the respective pieces 16–19. They can be stitched when their impregnants have dried and the fabrics are limp (B-stage cured). Final curing to the C-stage may be accomplished, as described, after wrap-up on the mandrel.

It will be understood that the described method (FIGS. 2, 3, 4) utilizes the localized thickened sock portion at 17–18 to effectively form an elongated key after the hardenable material has cured; this key is schematically suggested at 23 in FIG. 1. The circumferential overlap of the two pieces 16–19 establishes their consolidated relationship after curing; this relation ably serves the bearing, from radial-load considerations, and the key action at 18–20 enhances and assures an angularly locked relation between the inner and outer fabrics 16–19. The tensed wrap development of piece 19 over its folded (thickened) end 20 further enhances the key (or angularly located) action.

In FIG. 5, we illustrate a modification in which the unfolded starting end 20' of piece 19 is relied upon, adjacent the seam-thickened region 18. Again key action is achieved at 18–20', and this relationship is adequate to meet many requirements. An assembly tool, such as the tool 21, may again be used, but merely as a radially retaining positioning clamp element for the end 20' during the initial wrapping revolution.

In FIG. 6, we illustrate a further modification, similar to FIG. 5 except that the thickened leading end or edge 20'' of the bondable piece 19 is achieved by loosely stitching or basting the edge 20'' with a relatively heavy thread or string 22. Clamping upon wrap-up is then analogous to the action in FIGS. 2 to 4, and angular locking (or keying) action, after curing, is also similar to that in FIGS. 2 to 4.

On the second sheet of drawings, we illustrate further modifications of our method whereby a key-lock relation is achieved between the low-friction fabric sock 16 and the bondable fabric 19 used for wrap-up; in all these modifications, there is no need for resort to any stitching together or other integral formation of the two kinds of fabric.

In FIG. 7, enhanced key-locked engagement is achieved at both free ends of the seam flaps 17–18 by employing a fold-back or flap 25 at the lead edge of the bondable fabric 19, the angular extent of the fold-back being substantially that of the otherwise exposed periphery of the sock 16, i.e., between flaps 17–18. Upon wrap-up by the remainder of bondable fabric 19, as shown in FIG. 7A, the free end 26 of the fold-back 25 has an angular locating or interfering relation with the adjacent end of sock flap 17, and the crease 27 of fabric 19 has a similar but opposite angular locating or interfering relation with the adjacent end of sock flap 18. Upon curing the impregnant, the bondable layers lock tightly to form a keyed relation between the various fabric layers in the single solid hardened mass of cured plastic.

In FIGS. 8 and 8A, we show a modification wherein an intermediate layer 30 of bondable material is first assembled intermediate the seam and its flap region 17–18. Thus, layer 30 is pre-cut to a peripheral extent substantially matching the angular extent between flaps 17–18. Layer 30 may be merely a cut-off length of the same bondable material 19 as used for ultimate wrap-up. Layer 30 is preferably pre-impregnated with hardenable material and cured short of ultimate hardness but nevertheless cured to such stiffness and cylindrical curl as to resiliently cling to the sock 16 in its desired position between flaps 17–18, when assembled to make an intermediate or temporary assembly or composite with sock 16. The final wrap-up using bondable material 19 may then proceed in the described manner, with no particular care taken as to the angular location for commencement of wrap-up. In other words, with a tight wrapping of the modification of FIGS. 8 and 8A, the desired keying or locked relation of bondable and non-bondable fabric layers is achieved when cured with hardenable impregnant in the fabrics.

In FIGS. 9 and 9A, we illustrate a method similar to that of FIG. 6, except that additional stitching 31 is applied to the lead end of bondable material 19, at a location spaced the distance L from the edge 20'' of the lead end. The distance L is substantially the otherwise exposed peripheral extent of sock 16 between flaps 17–18 and, on wrap-up, the lead end is applied to the sock so as to locate the length L between the flaps 17–18. Upon continued wrap-up and ultimate curing, the localized additional bondable material thickness at the stitched regions 22–31 is seen to provide enhanced key-locking functions between the two kinds of fabric.

In FIGS. 10 and 10A, the method is the same as in FIGS. 9 and 9A, except that further stitching is applied to the lead end of the bondable fabric 19 at plural locations throughout the distance L. Several such locations are identified at 32–33 in FIG. 10A, although it will be understood that all stitches 22 to 31 may be made as one series throughout the distance L, as in a loose zig-zag, suggested in the showing of FIG. 10. The additional stitching will be seen to enhance the key effects described in connection with FIGS. 9 and 9A.

It will be understood that in lieu of tensioning the unwrapped remainder of the bondable piece 19, the desired result of tension and radial squeeze during wrap-up may be achieved by rolling the progressively wrapped mandrel in squeezed relation to a table, on which the bondable piece has been laid, prior to wrapping. This technique is usable for all described embodiments.

It will be seen that the invention provides an improved bearing construction wherein not only may there be substantial manufacturing economy through use of the low-friction material only at the bearing surface, but a given supply of such low-friction material may be cut as needed to serve bearing production for a variety of bore sizes and outer-diameter sizes, all as more fully explained in said copending application. The same cured tubular basic stock serves ultimate bearings of a variety of lengths, as called for by the customer. Furthermore, the use of separate low-friction stock 16 and bondable stock 19 permits optimized impregnation of each stock (16–19) and curing to dry limp form, prior to cut-off to size, without requiring both fabric pieces 16–19 to be subjected to one and the same impregnant or degree of impregnation. In all described embodiments key action (23) characterizes the angularly locked relation between the hardened liner region (16) and the hardened body region (19).

Although the invention has been described in connection with the preferred forms and methods, it will be understood that modifications may be made without departing from the scope of the invention as defined in the claims which follow.

What is claimed is:

1. The method of making a fabric-lined journal bearing having a bore determined by a mandrel, which comprises selecting from rectilinear stock a piece of low-friction fabric material having between cut-off ends an effective length to define one dimension substantially equal to the peripheral extent of the mandrel, securing said ends to form an elongated sock with an elongated seam defining an angularly localized thickened portion, assembling the sock to the mandrel with low-friction material in contact with the mandrel, selecting from rectilinear stock an elongated piece of bondable fabric material which is elongated by at least several times the effective length of said one dimension, whereby beginning with a first longitudinal end of said second piece a convolute wrap-up of the second piece may be achieved around the mandrel, said piece of bondable fabric material being impregnated with hardenable material, applying said first longitudinal end to said sock at a location angularly offset from said thickened portion, wrapping the second piece around the sock and mandrel in the direction away from said seam, whereby a substantial peripheral wrap occurs before said second piece overlaps said seam, said wrap being under tension to clamp said first longitudinal end upon wrapped overlap therewith, continuing the wrap to define a plurality of successive layers of said bondable material, curing to hardness the hardenable material of the wrapped-up assembly, and then removing the mandrel.

2. The method of claim 1, in which said first longitudinal end of said second piece is folded over to define a locally thickened start of the wrap-up of said second piece.

3. The method of claim 1, in which said first longitudinal end of said second piece is laid flat against said sock, in substantial adjacency with the folded-back end of the low-friction material at the seam.

4. The method of claim 1, in which said second piece is stitched near said first longitudinal end, to define a locally thickened start of the wrap-up of said second piece.

5. The method of claim 1, in which a seam allowance is provided at the stitching near said ends, thereby defining a flap of low-friction material at the seam, said flap being laid back over the adjacent body of the sock, said first longitudinal end of said second piece laid against the remaining externally exposed surface of the sock prior to wrapping overlap with the seam.

6. The method of claim 1, in which said low-friction fabric material includes fibrous polytetrafluoroethylene woven therein.

7. The method of making a fabric-lined journal bearing having a bore determined by a mandrel, which comprises selecting from rectilinear stock a piece of low-friction fabric material having between cut-off ends an effective length to define one dimension slightly greater than the peripheral extent of the mandrel, stitching the cut-off ends to form a sock with a seam allowance to define an elongated flap, laying the flap back against the adjacent body of the sock, selecting from rectilinear stock an elongated piece of bondable fabric material which is elongated by at least several times the effective length of said one dimension, applying a first longitudinal end of said second piece to the exposed body of the sock beginning at a location angularly offset from said flap, pinching said first end to said sock and mandrel while wrapping said bondable piece under tension around said sock in the direction away from said seam, and curing to hardness a hardenable material in impregnated relation with said pieces.

8. The method of making a fabric-lined journal bearing having a bore determined by a mandrel, which comprises selecting from rectilinear stock a piece of low-friction fabric material having between cut-off ends an effective length to define one dimension slightly greater than the peripheral extent of the mandrel, stitching the cut-off ends to form a sock with a seam allowance to define two adjacent short elongated flaps, laying both flaps in opposed directions back against the adjacent body of the sock, selecting from rectilinear stock an elongated piece of bondable fabric material which is elongated by at least several times the effective length of said one dimension, applying a first longitudinal end of said second piece to the exposed body of the sock beginning at a location angularly offset from said flaps, pinching said first end to said sock and mandrel while wrapping said bondable piece under tension around said sock in a direction producing substantial overlap with the exposed body of the sock prior to overlap with said flaps, and curing to hardness a hardenable material in impregnated relation with said pieces.

9. The method of claim 8, in which said first longitudinal end of said second piece is folded back to define a locally thickened start of the wrap-up of said second piece, the angular extent of the fold-back being such as to terminate short of overlap with either of said flaps.

10. The method of claim 9, in which the fold-back substantially occupies the peripheral extent of the sock between ends of said flaps.

11. The method of claim 8, in which said second piece is stitched at a location so removed from said first longitudinal end that, on wrapping, the span of said second piece from said first longitudinal end to the stitched location substantially occupies the peripheral extent of the sock between ends of said flaps.

12. The method of claim 11, in which said second piece is stitched near said first longitudinal end to define a locally thickened start of the wrap-up of said second piece.

13. The method of claim 11, in which said span is characterized by plural stitchings.

14. The method of making a fabric-lined journal bearing having a bore determined by a mandrel, which comprises selecting from rectilinear stock a piece of low-friction fabric material having between cut-off ends an effective length to define one dimension slightly greater than the peripheral extent of the mandrel, stitching the cut-off ends to form a sock with a seam allowance to define a relatively short elongated flap, laying the flap back against the adjacent body of the sock, selecting from rectilinear stock a first elongated piece of bondable fabric material which is elongated to substantially the extent of the exposed periphery of said sock between limits of said flap, selecting from rectilinear stock a second piece of bondable fabric material which is elongated by at least several times the effective length of said one dimension, applying said first bondable piece to said sock between limits of said flap, thereby defining an intermediate composite, then wrapping said second bondable piece in plural convolute layers around said composite, and curing to hardness a hardenable material in impregnated relation with said pieces.

15. The method of claim 14, in which said first bondable piece is impregnated with hardenable material and partially cured prior to assembly to said sock.

16. The method of claim 15, in which the partial cure of said first bondable piece is to a predetermined stiffness and cylindrical curl such as to resiliently retain the composite assembly during subsequent wrapped assembly of said second bondable piece.

17. A fabric-lined journal bearing comprising an inner cylindrical surface defined by a single layer of fabric of low-friction material, the layer being formed from a sheet of such dimension that when joined at an axially extending seam a locally thickened region is formed, and a succession of circumferential wrappings of a single sheet of bondable fabric wrapped around and bonded to said layer and to each other, the inner end of said single sheet of bondable fabric being angularly off-set, in spaced relation, from said thickened region.

18. A bearing according to claim 17, wherein said thickened region comprises an elongated key effective to interlock said single layer with said succession of wrappings of said single sheet of bondable fabric.

19. A bearing according to claim 17, wherein the layers are held together by an impregnated and cured resin.

20. A bearing according to claim 17, wherein said thickened region is defined by flaps formed at the seam which flaps are spread and bent back flat to form a local thickening.

References Cited

UNITED STATES PATENTS

| | | | |
|---|---|---|---|
| 1,745,704 | 2/1930 | Muncy | 29—149.5 |
| 2,025,830 | 12/1935 | Rosmait | 156—189 |
| 3,235,941 | 2/1966 | Krotz | 29—149.5 |

THOMAS H. EAGER, Primary Examiner

U.S. Cl. X.R.

156—188; 308—238